UNITED STATES PATENT OFFICE.

LEON LILIENFELD, OF VIENNA, AUSTRIA, ASSIGNOR, BY MESNE ASSIGNMENTS, TO THE CHEMICAL FOUNDATION, INC., A CORPORATION OF DELAWARE.

PROCESS OF MAKING CELLULOSE XANTHOGENATE SOLUTIONS AND PRODUCT PRODUCED.

1,379,351.    Specification of Letters Patent.    Patented May 24, 1921.

No Drawing. Application filed May 16, 1914, Serial No. 839,079. Renewed September 24, 1919. Serial No. 325,963.

*To all whom it may concern:*

Be it known that I, Dr. LEON LILIENFELD, chemist, a subject of the Emperor of Austria, and a resident of 1 Zelgasse, Vienna, VIII, in the Empire of Austria, have invented a Process of Making Cellulose Xanthogenate Solutions and Product Produced, of which the following is a specification.

It is known that when a solution of viscose is heated to 90° C. or is treated with mineral acids for some considerable time, it is decomposed with the simultaneous separation of cellulose hydrate, which after having been washed in water is free from sulfur, is soluble, although with great difficulty, in concentrated solutions of caustic soda.

It is further known that raw viscose can be purified by heating the solution of viscose for a short time to 45 to 50° C., allowing it to flow into a salt solution, leaving it for a considerable time in contact with the salt solution, and after washing out the precipitated xanthogenate, redissolving the latter in alkali.

The present invention is based on the surprising discovery that precipitated zanthogenates, which are readily soluble in solutions of alkalis of moderate concentration, and whose solutions are of considerable utility in the industries, may be produced from raw viscose solution by subjecting the same (preferably in a suitably diluted condition) to a temperature of 60 to 80° C., and maintaining them at this temperature until a precipitated xanthogenate, which is completely insoluble in water but is readily soluble in dilute alkali solutions, is produced, then washing the precipitate very thoroughly in water until it has lost its color and is pure, and then dissolving it in alkali solutions.

The fact that the body which is separated out according to the present process by heating the raw viscose and which is very thoroughly washed in water, contains sulfur in the form or organic sulfur compounds; the fact that its solutions when treated with mineral acids or when heated or the like, separate out the same cellulose-hydrate having the same chemical properties as that which is produced from viscose by precipitating with mineral acids or by heating for a suitable length of time; and the fact that its solutions give a yellow color with cupric salts, and are precipitated by solutions of iodin; all constitute a proof that there is obtained one of the highest xanthogenate forms of cellulose.

The solutions of the improved cellulose xanthogenate are characterized by a very remarkable permanency for they may be left for weeks at room temperature (18 to 22° C.) without coagulating.

On forcing or squirting such solutions through capillary orifices or nozzles or through slits into mineral acids, they solidify with remarkable rapidity into the form of transparent, clear and extremely strong threads or films which on being washed and dried acquire a high luster and a remarkable tenacity in a dry or wet condition.

Owing to the great purity of the improved xanthogenate solutions, the coagulating baths become only very slightly improved, and can therefore be thoroughly utilized and employed for a very long time.

The coagulated filament or film also contains no appreciable quantity of impurities, thus enabling it to be easily and rapidly washed and constitutes a finished filament or film of great strength.

A further important technical improvement is that the solutions of the very thoroughly washed xanthogenate produced from raw viscose by the improved process, coagulate even in mineral acids alone (for instance, sulfuric acid or the like) into the form of clear, transparent and strong threads and films, so that there is no need for any addition of salts, glucose or the like.

The solutions are suitable for all purposes for which raw or purified viscose is used, for instance for the manufacture of artificial filaments or threads or spun yarns, and textiles, especially artificial silk, films, plastic masses (substitutes for celluloid, horn, ivory, tortoise-shell and the like), dressing and loading fabrics, printing on textiles, paints and coatings of all kinds, sizing paper, and other purposes for which such solutions may be used.

In carrying out the process preferably a matured raw viscose having a not too high degree of concentration is used, which, preferably with constant stirring, is raised to a temperature of 60 to 80° C. At this temperature the raw viscose is converted into a jelly. This jelly is now maintained preferably with constant stirring at 60 to 80° C., until a precipitate suspended in the mother-liquor has separated out which can be at once washed easily and quickly in cold water without swelling therein, and which after having been washed is readily dissolved in a solution of caustic soda, so as to form freely flowing solutions which contain about 8 to 10 per cent. of caustic soda. A too protracted period of heating is to be avoided because otherwise the separated xanthogenate will become converted into the well known cellulose hydrate which has been produced hitherto by heating viscose for a suitable period of time, at for instance 90° C. A too contracted period of heating, is however also to be avoided because otherwise the separated body or the separated jelly cannot be readily washed with cold water, but swells therein and either wholly or partly dissolves so that it cannot be treated directly with water, but must be treated with salt solutions.
With practice, however, the operator will find the correct moment each time, and will be able to stop the heating at the proper time. The termination of the reaction is best ascertained by the fact that the thick jelly which offers a certain resistance to the stirring rod or stirring device becomes thinner, and gives way to a precipitate which is uniformly distributed in the thin mother-liquor, and offers to the stirring rod or stirring device a smaller resistance than that of the preceding jelly.

Whereas the jelly adhered to the stirring rod or stirring device, the reaction-mixture consisting of mother-liquor and precipitate, runs off the stirring rod or stirring device when the reaction is finished.

According to the degree of concentration of the viscose and the temperature, the time from the beginning of the separating-out of the jelly to the end of the reaction in which the water-insoluble but alkali-soluble xanthogenate has formed, is from about 5 to 15 minutes. If concentrated solutions of viscose are employed each time as the raw material, and if the operation is effected each time at the same temperature, the operator will be able to determine the completion of the reaction according to the time which lapses after the commencement of the separating out of the jelly. The more concentrated the raw viscose solution, the shorter will be the operation.

Very suitable for the present process is a raw viscose poor in alkali, which has been produced according to the process described in my application Serial No. 672119 filed January 19th 1912. This viscose is obtained by the action of carbondisulfid from an alkali-cellulose which contains (calculated on caustic soda) not more than 30 parts and preferably 24 to 25 parts by weight of alkali-hydroxid to 100 parts by weight of cellulose and gives very reliable results.

*Practical example No. 1.* Upon 200 parts by weight of cellulose placed in a well closed vessel there are poured 1800 parts by weight of a solution of caustic soda of 18% strength, and the mixture is allowed to remain from 12 to 24 hours at a temperature of from 18° to 22° C. At the end of this period the mass is pressed until there remains from 480 to 500 parts by weight and the pressed cake is crushed and allowed to remain, thus for about three days at 18° to 22° C. At the end of this period the soda cellulose is treated with 80 to 120 parts by weight of carbon disulfid in a well closed vessel for from 3 to 5 hours at a temperature of 18° to 22° C. Then the excess carbon disulfid is blown off, and to the carbon xanthogenized mass there is added, with kneading and stirring, as much water as will bring the total weight up to 1420 parts by weight.
When solution has been effected, the viscose is left at the temperature of the room (18° to 22° C.) for 2 to 4 days, and is then diluted gradually with 7500 parts by weight of water.
The 8920 parts by weight of viscose solution, containing the 200 parts of cellulose, are now placed in a suitable vessel, into a boiling water bath and energetically stirred. The temperature is taken every five minutes.

The initial temperature of the viscose solution is 14° C.

After 5 minutes the temperature is 19° C.
After 10 minutes the temperature is 26° C.
After 15 minutes the temperature is 33° C.
After 20 minutes the temperature is 40° C.
After 25 minutes the temperature is 47° C.
After 30 minutes the temperature is 54° C.
After 35 minutes the temperature is 61° C.
After 40 minutes the temperature is 67° C.
After 45 minutes the temperature is 71° C.
After 50 minutes the temperature is 73° C.

After 50 minutes the separating out of the jelly begins, which is indicated by the occurrence of streaks at the center of the surface of the viscose.

On further heating the jelly becomes still thinner.

After 55 minutes the temperature is 74° C.
After 60 minutes the temperature is 75° C, The mass has become considerably more dilute and it runs off readily from the stirring rod. After a further lapse of one minute, the heating is stopped and the motherliquor with the precipitate is poured upon a straining cloth, and rapidly cooled with a jet of cold water. The fine precipitate is then washed in cold water with stirring at intervals, until both the mass and the filtrate are entirely devoid of color, and until the mass has a complete neutral reaction on red litmus.

The mass is now allowed to drain, and the fine precipitate is pressed until it consists of 2000 parts by weight, and it is then dissolved in 400 parts by weight of a solution of caustic soda of 50 degrees Bé. with the result that a freely flowing solution is produced containing about 8 per cent. of cellulose xanthogenate, and about 8 per cent. of caustic soda. It is now ready for use but may, if desired, be strained or filtered through a cotton fabric or by means of a filter press or other filtering device.

*Practical example No. 2.*

The production of the viscose solution is the same as in example No. 1. Only the mass treated with carbon disulfid is, immediately after the treatment with the disulfid, dissolved in sufficient water to bring the total weight up to 4000 parts by weight. These 4000 parts by weight, (corresponding to 200 parts by weight of the initial cellulose,) are now left at rest for from 48 to 100 hours at the room temperature of 18° to 22° C. At the expiration of this period the viscose is diluted with 4920 parts by weight of water, and is heated in the same manner as in example No. 1.

The initial temperature of the viscose is 13° C.

After 5 minutes the temperature is 18¼° C.
After 10 minutes the temperature is 25° C.
After 15 minutes the temperature is 32° C.
After 20 minutes the temperature is 39° C.
After 25 minutes the temperature is 48° C.
After 30 minutes the temperature is 55° C.
After 35 minutes the temperature is 62° C.
After 40 minutes the temperature is 65° C.
After 45 minutes the temperature is 69° C.
After 50 minutes the temperature is 71° C.

After 52 minutes the separation of the jelly begins.

After 55 minutes the temperature is 72° C.
After 60 minutes the temperature is 74° C.

The jelly becomes thinner and the reaction mass runs readily off the rod.

After 62 minutes the heating is stopped. The further treatment is then the same as in example No. 1.

It is to be understood that the duration of the reaction may be shortened by increasing the temperatures more rapidly, and may be lengthened by increasing the temperatures more slowly.

*Practical example No. 3.*

The manufacture of the raw viscose solutio is effected as in examples Nos. 1 and 2.

The mass treated with carbon disulfid is, as in example No. 1, dissolved in water so as to bring its total weight up to 1420 parts by weight.

The viscose is left in this condition at the room temperature for 2 to 4 days. It is then diluted with 1420 parts by weight of water and is heated as in examples No. 1 and No. 2; the temperatures are, however, increased rather more rapidly so that the reaction is completed in 40 minutes.

The further treatment is the same as in examples No. 1 and No. 2.

The process of the present invention is suitable for use in connection with viscose which is poor in alkali, that is to say viscose containing less than 40 parts of dry NaOH for each 100 parts of cellulose. The process has given particularly useful results in the treatment of viscoses which contain to each 100 parts of air-dry cellulose only about 25 to 30 parts of dry caustic soda. The viscose poor in alkali as herein referred to, is not claimed herein, but in my copending application 672,119, filed January 19, 1912.

It is however to be noted, that the present invention is not restricted to the employment of viscose poor in alkali, but on the contrary the process may also be successfully operated, by employing viscose containing more than 40 parts of dry caustic soda to each 100 parts of cellulose.

What I claim as my invention and desire to secure by Letters Patent is:

1. A process of making pure cellulose xanthogenate solutions from viscose solution which comprises heating the viscose solution alone to a temperature capable of precipitating a water-insoluble xanthogenate without adding other materials capable of acting as precipitants, washing the precipitate thoroughly with water, and thereafter dissolving the washed precipitate in a solution of caustic alkali substantially as described.

2. A process of making cellulose xanthogenate solutions from viscose solution, which comprises heating the viscose alone to a temperature of from 60 to 80° C., so as to precipitate a water-insoluble xanthogenate without adding other precipitating agents, washing the precipitate with water and thereafter dissolving the washed precipitate in a solution of caustic alkali substantially as described.

3. A process of making cellulose xanthogenate solutions which comprises heating a raw viscose solution containing an amount of alkali equivalent to not more than 30 parts by weight of alkali to 100 parts of cellulose, without addition of precipitating agents, sufficiently to precipitate a water-insoluble cellulose xanthogenate, washing said precipitate with water and thereafter dissolving the same in a solution of caustic alkali substantially as described.

4. A process of making cellulose xanthogenate solution from viscose which comprises heating to a temperature of from 60 to 80° C., without addition of other materials thereto, a viscose solution obtained from an alkali cellulose containing an amount of caustic alkali equivalent to not more than 30 parts by weight of caustic soda to 100 parts of cellulose, thereby obtaining a precipitated cellulose xanthogenate which is insoluble in water, washing said cellulose xanthogenate thoroughly with water, and dissolving the same in a solution of caustic alkali substantially as described.

In testimony whereof I have signed my name to this specification in the presence of two subscribing witnesses.

Dr. LEON LILIENFELD.

Witnesses:
 HERMAN WUNDERLICH,
 ADA MARIA BERGER.